United States Patent [19]

Clavin

[11] 4,002,050
[45] Jan. 11, 1977

[54] FORCE MAINTAINING TOGGLES SYSTEMS

[75] Inventor: Edward Albert Clavin, Houston, Tex.

[73] Assignee: Mid-Continent Pipeline Equipment Co., a division of Harrisburg, Inc. a Texas Corporation, Houston, Tex.

[22] Filed: June 11, 1975

[21] Appl. No.: 585,976

[52] U.S. Cl. .................. 72/466; 72/392; 72/451; 74/520

[51] Int. Cl.² ............... B21D 9/00; G05G 1/04

[58] Field of Search ........... 72/392, 393, 451, 466; 74/109, 110, 422, 437, 520, 98; 269/48.1

[56] References Cited

UNITED STATES PATENTS

| | | | |
|---|---|---|---|
| 277,988 | 5/1883 | Burk | 74/437 |
| 316,160 | 4/1885 | McDonald | 74/109 |
| 434,442 | 8/1890 | Gordon | 74/422 |
| 448,525 | 3/1891 | Kennedy | 74/98 |
| 727,189 | 5/1903 | Nysewander | 74/109 |
| 1,237,736 | 8/1917 | Aborn | 74/437 |
| 1,825,030 | 9/1931 | Vaughn | 72/393 |
| 3,602,031 | 8/1971 | Graff | 72/393 |

OTHER PUBLICATIONS

*Product Engineering*, June 1942, pp. 326–327, "Power Thrust Linkages and Their Applications".

Primary Examiner—Lowell A. Larson
Attorney, Agent, or Firm—Carl B. Fox, Jr.

[57] ABSTRACT

Force maintaining toggle systems wherein maximum or near maximum force is maintained by a series of step wise toggle engagements. The forces may be applied between spaced objects arranged oppositely or circularly.

28 Claims, 8 Drawing Figures

FORCE MAINTAINING TOGGLES SYSTEMS

BACKGROUND AND SUMMARY OF THE INVENTION

In conventional toggle mechanisms, the force applied through the toggles approaches maximum as the toggles are moved toward the line of force application, and the force applied through the toggles becomes maximum when the toggle reaches the force application direction. The force is therefore at or near maximum only when the toggle is at or near the force application direction. When the toggles are at larger angles to the force application direction, the force applied through the toggles is less than maximum depending upon the magnitude of the angle. This invention provides toggle systems wherein the force applied through the toggles may be maintained at or near maximum over greater angles of toggle movement.

According to the invention, toggle systems are provided which may either maintain maximum or near maximum toggle force application over extended angles of toggle movement, or which may in step wise fashion increase toggle force magnitude from a lower value to a higher value. Plural toggle engagements are provided which serially in turn provide maximum toggle force application, whereby the maximum toggle force is maintained over larger ranges of toggle movement. The engagements step wisely elongate the effective length of the toggle to derive the force maintenance or force increase.

A principal object of the invention is to provide toggle systems wherein the force applied through the toggles is maintained or increased over larger angles of toggle movement. Another object of the invention is to provide such toggle systems wherein the toggle position is maintained at or near the force application direction over increased angles of toggle movement. Still another object of the invention is to provide such toggle systems which are simple, economical, yet dependable.

Other objects and advantages of the invention will appear from the following detailed description of preferred embodiments, reference being made to the accompanying drawings.

DESCRIPTION OF THE PREFERRED EMBODIMENTS

Figure 1:
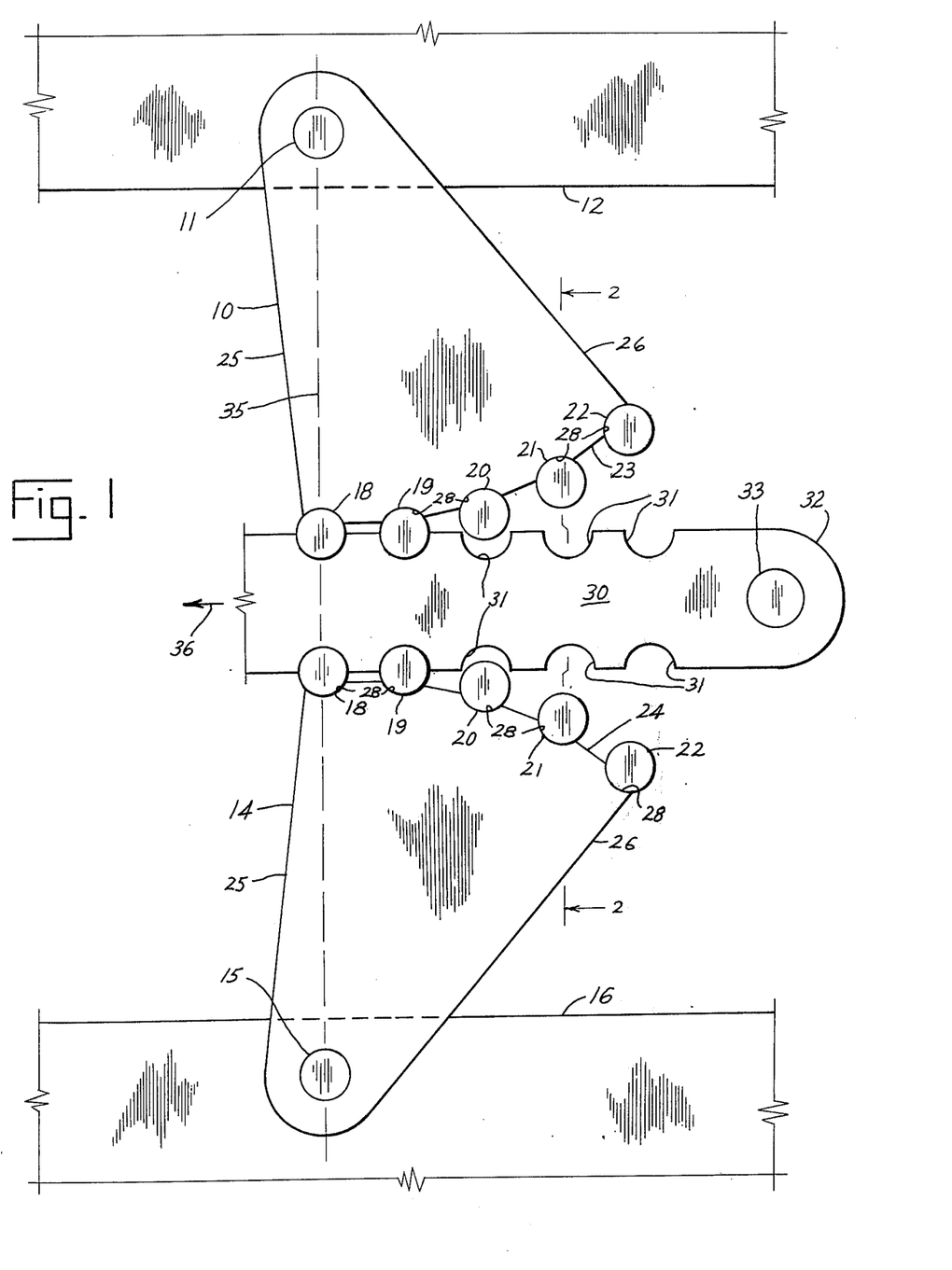
FIG. 1 is an elevation of a toggle system of preferred form, according to the invention.
Figures 2, 3:
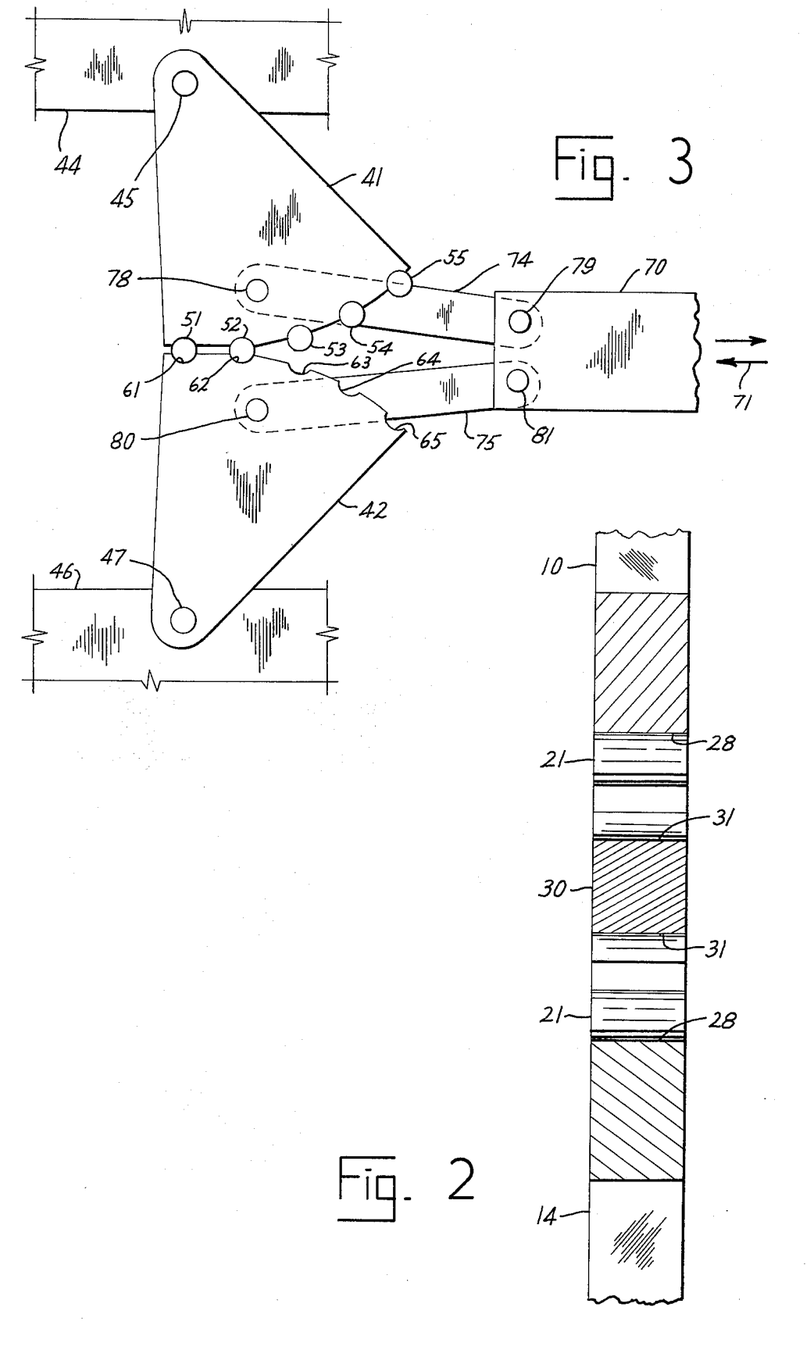
FIG. 2 is a vertical cross section taken at line 2—2 of FIG. 1.
FIG. 3 is an elevation of a modified form of toggle system according to the invention.

Referring first to FIGS. 1–2 of the drawings, the toggle element 10 is pivotally connected at pin 11 to object 12. The identical mirror image toggle element 14 is pivotally connected at pin 15 to object 16. Each of the toggle elements 10, 14 has a plurality of transversely disposed parallel cylindrical engagement bars 18–22 affixed to its curved inner edge 23, 24, respectively. The engagement bars 18–22 are each affixed in a shallow arcuate recess 28 in the inner end or side of the toggle element corresponding to the shape of the bar.

The toggle elements 10, 14 are of a generally triangular shape, having two straight sides 25, 26 and curved side 23 or 24. The curved sides 23, 24 may be varied in length, and may have any suitable number of engagement elements 18–22 consistent with the concepts of the invention. The size and spacing of the engagement elements may be varied. The engagement elements may be integral with the plates forming the toggle elements, or separate as shown. The toggle elements and engagement elements may take other suitable forms than those specifically shown herein. The pivotal connections of the toggle elements to objects 12, 16 may be of any suitable form.

Each successive engagement bar 18–22 is farther from a pivotal engagement 11 or 15 than the last. In other words, bars 19 are farther from pins 11, 15 than are bars 18, bars 20 are farther from pins 11, 15 than are bars 19, and so on. The effective lengths of the toggle elements is increased as bars 18–22 are successively pivoted to the position of line 35, which extends through the axes of pins 11, 15. The toggle system, therefore, is useful for urging objects 12, 16 apart under maintained high force which would not be possible with simple toggle elements.

A toggle actuator bar 30, or operator, has a plurality of hemi-cylindrical recesses 31 oppositely disposed at the opposite edges. Recesses 31 serve as engagement means for engaging bars 18–22. Bar 30 is shown rounded at its end 32 and may be linked to any suitable device for moving the actuator bar longitudinally, by a pin connection 33. The recesses 31 are spaced to receive the bars 18–22 when the toggles and actuator bar are moved to bring the bars into the recesses. The bars 18–22 and recesses 31 may be reversed in position, with the bars 18–22 on bar 30 and recesses 31 on toggle elements 10, 14.

Assuming, by way of example, that objects 12–16 are to be moved farther apart by the toggle apparatus shown. With actuator bar 30 in a position farther to the right than shown in FIG. 1, the engagement bars 18 of toggles 10, 14 are received in the leftmost of the recesses 31. Then bar 30 is moved toward the left, as shown in FIG. 1, until the bars 18 are in line between pins 11, 15, as indicated by dashed line 35, which is the toggle element position shown in FIG. 1. As bars 18 approach this position, the vertical forces applied through toggle elements 10, 14 approach maximum, and arrive at maximum force when engagement bars 18 are in line with line 35 extending between pins 11, 15. When the two bars 18 arrive at this position, the bars 19 become just seated in the recesses 31 second from the left. Further movement of actuator bar 30 in the direction of arrow 36 will bring engagement bars 19 to the position of line 35 so that the force applied through bars 19 and through the toggles will become maximum. At this time, the engagement bars 20 will be just seated in the recesses 31 located third from the left. Still further movement of bar 30 toward the left will bring bars 20, 21 and 22 successively to the position of line 35. As each of the engagement bars reaches this position, a maximum vertical force between objects 12, 16 is applied through toggle elements 10, 14 to urge the objects 12, 16 farther and farther apart. But unlike the ordinary toggle, the maximum force achieved when the engagement bars are in line between pins 11, 15 is successively repeated so that a high force, approaching infinity theoretically, is applied through the toggles to urge the objects 12, 16 apart.

Referring now to FIG. 3 of the drawings, the toggle elements 41, 42 are of the same general form as toggle elements 10, 14 of FIGS. 1-2. Toggle element 41 is pivotally connected to object 44 at pin 45, and toggle element 42 is pivotally connected to object 46 at pin 47. Toggle element 41 has a plurality of parallel engagement bars 51-55 fixed transversely in shallow recesses corresponding to the cylindrical shapes of the engagement bars. Toggle element 42 has the same plurality of similarly spaced arcuate recesses 61-65 in which the engagement bars 51-55 of toggle element 41 successively engage. Link 74 is connected to toggle element 41 at pin 78 and to actuator bar 70 at pin 79. Link 75 is connected to toggle element 42 at pin 80 and to bar 70 at pin 81. When actuator bar 70 is moved toward the left as indicated by arrow 71, force is applied through links 74, 75 to the toggle elements 41, 42, respectively, whereby the toggle elements are successively pivotally moved through maximum force positions wherein bars 51-55 are in line between pins 45, 47.

Again, the vertical forces applied through toggles 41, 42 is at or near maximum as each successive engagement bar 51-55 is moved toward and into an aligned position between pins 45, 47. Therefore, the vertical forces through the toggle elements are maintained high, at or near maximum, throughout the full toggle travel from the aligned position of bar 51 to the aligned position of bar 55.

It will be noted that the distance from pin 45 to bar 51 is shorter than the distance to bar 52, and the distance is increased, step wise for bars 53-55, so that the objects 44, 46 are continuously moved farther and farther apart under high vertical forces. The recess 61-65 distances from pin 47 correspond to the bar 51-55 distances from pin 45.

Figure 4:
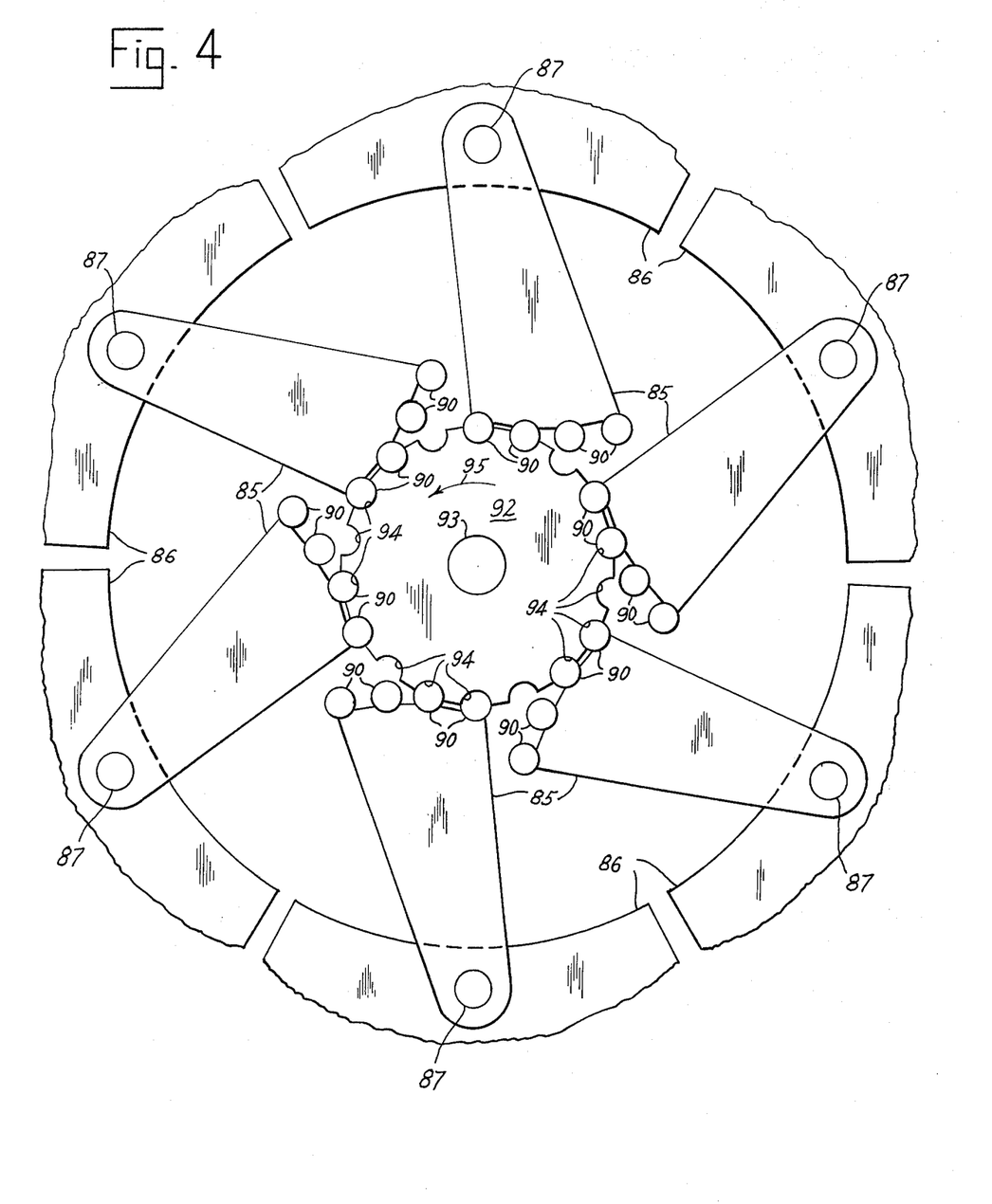
FIGS. 4–5 are elevations of other modified toggle systems according to the invention.

Referring to FIG. 4 of the drawings, a toggle system is shown which is useful for applying force radially outward against circularly disposed objects 86. A plurality of toggle elements 85, six being shown, are pivotally connected at their outer ends to objects 86 by pins 87.

A plurality of spaced parallel engagement bars 90 are affixed transversely in shallow recesses to the inner end of each toggle element 85. A circular member 92 which rotates around central shaft 93 has a plurality of equally spaced cylindrical recesses 94 around its periphery. The engagement bars 90 of each toggle 85 are successively farther from pin 87 from one side of the inner toggle end to the other. As member 92 is rotated in the direction of arrow 95, the engagement bars 90 of each toggle element successively become engaged in corresponding recesses 93 to successively maintain outward maximum toggle force on the objects 86. Therefore, maximum or near maximum outward force is applied through the toggle elements throughout the complete angle of toggle motion. This result would not be achieved by simple toggles having only one connection to circular member 92.

Figure 5:
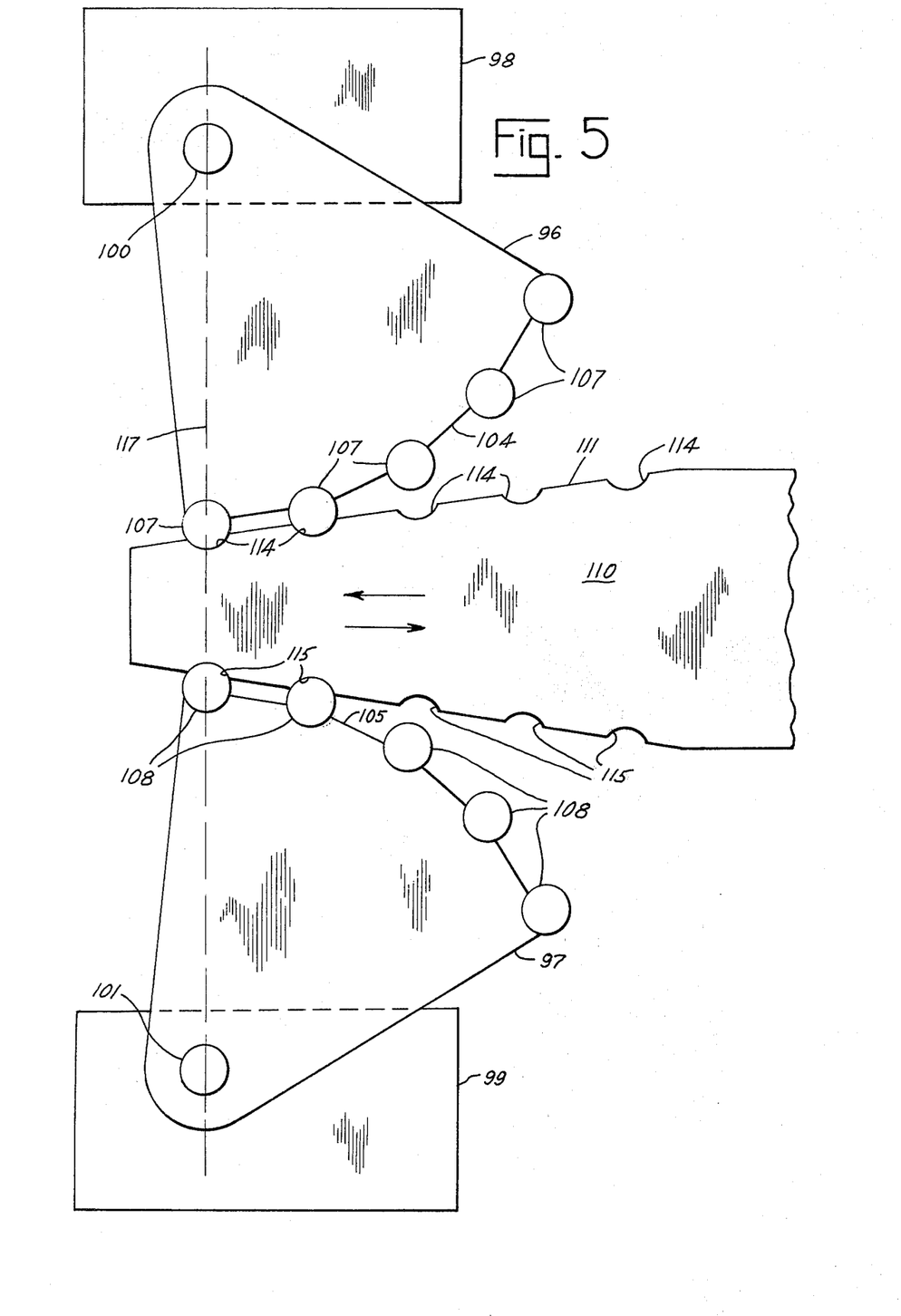

Another form of apparatus according to the invention is shown in FIG. 5 of the drawings. In this modification, the toggle elements 96, 97 are of different form than the toggle elements shown in the other drawings. Elements 96, 97 are pivotally connected to objects 98, 99 at pins 100, 101, respectively. The inner ends 104, 105 of toggle elements 96, 97 are circular, and the engagement bars 107, 108 are all at the same distance from the respective pins 100, 101, instead of being at increasing distances as in FIGS. 1-4.

The actuating bar 110 has angular opposite sides 111, 112, which taper inwardly toward its lefthand end, reducing the vertical thickness of the bar. Sides 111, 112 have plural opposed cylindrical recesses 114, 115 spaced therealong, as shown. The recess spacings 114, 115 and the bar spacings 107, 108 are identical, and will usually be equal as shown. It will by now be apparent that since the vertical thickness of bar 110 increases toward the right, the effective vertical toggle length will be increased as the engagement bars farther to the right become engaged in recesses 114, 115 farther to the right as they are brought to the maximum force position at line 117 through pins 100, 101 by leftward movement of bar 110. As before, maximum force is maintained against objects 98, 99 as the pivotal toggle element movement proceeds.

Since toggle elements 96, 97 are arcuate at their inner edges, they may be made in the form of complete circles, and may make more than one revolution in sequentially engaging in the recesses 114, 115 of the actuator bar.

Figure 6:
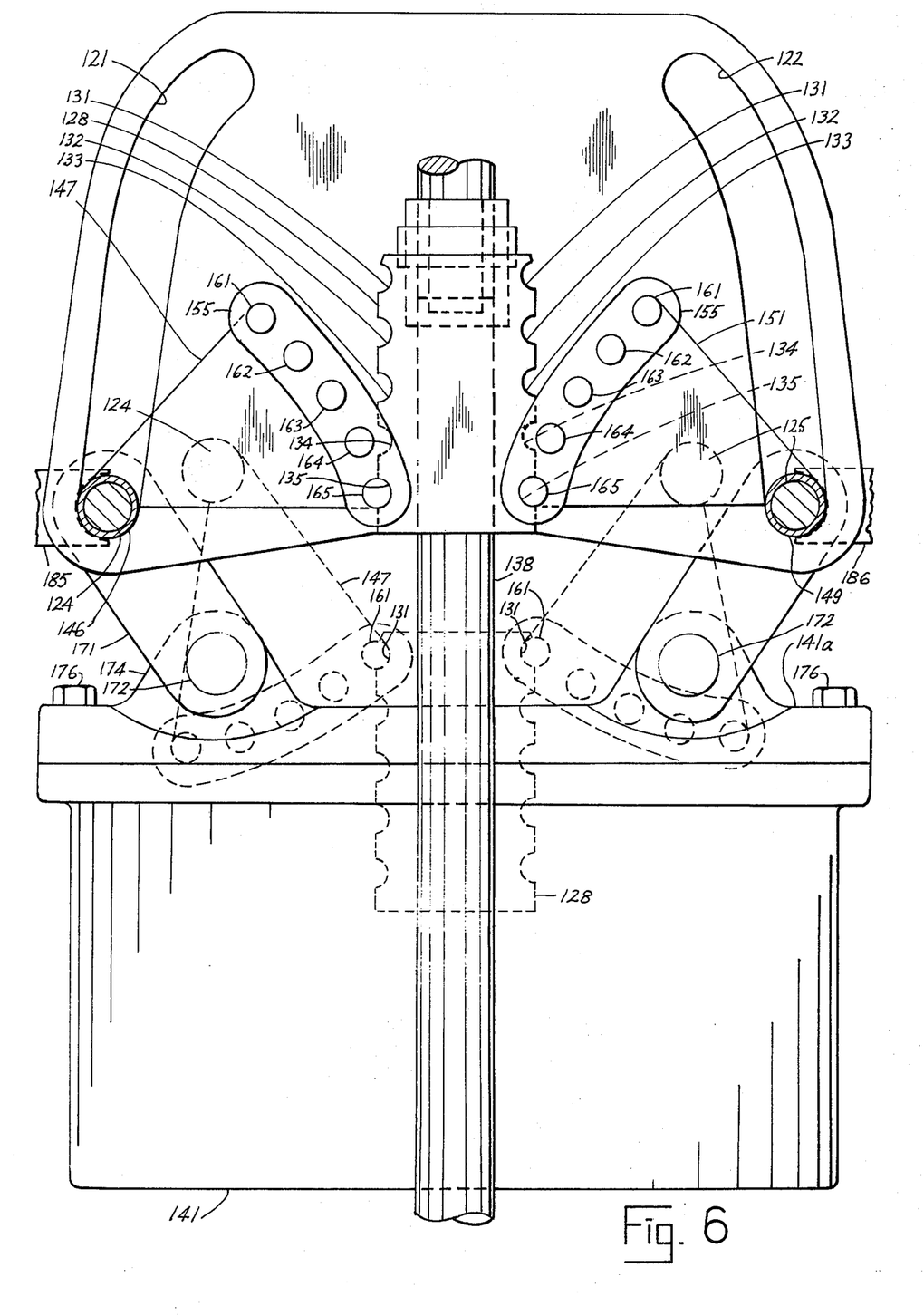
FIG. 6 is an end elevation of another form of toggle system according to the invention.
Figure 7:
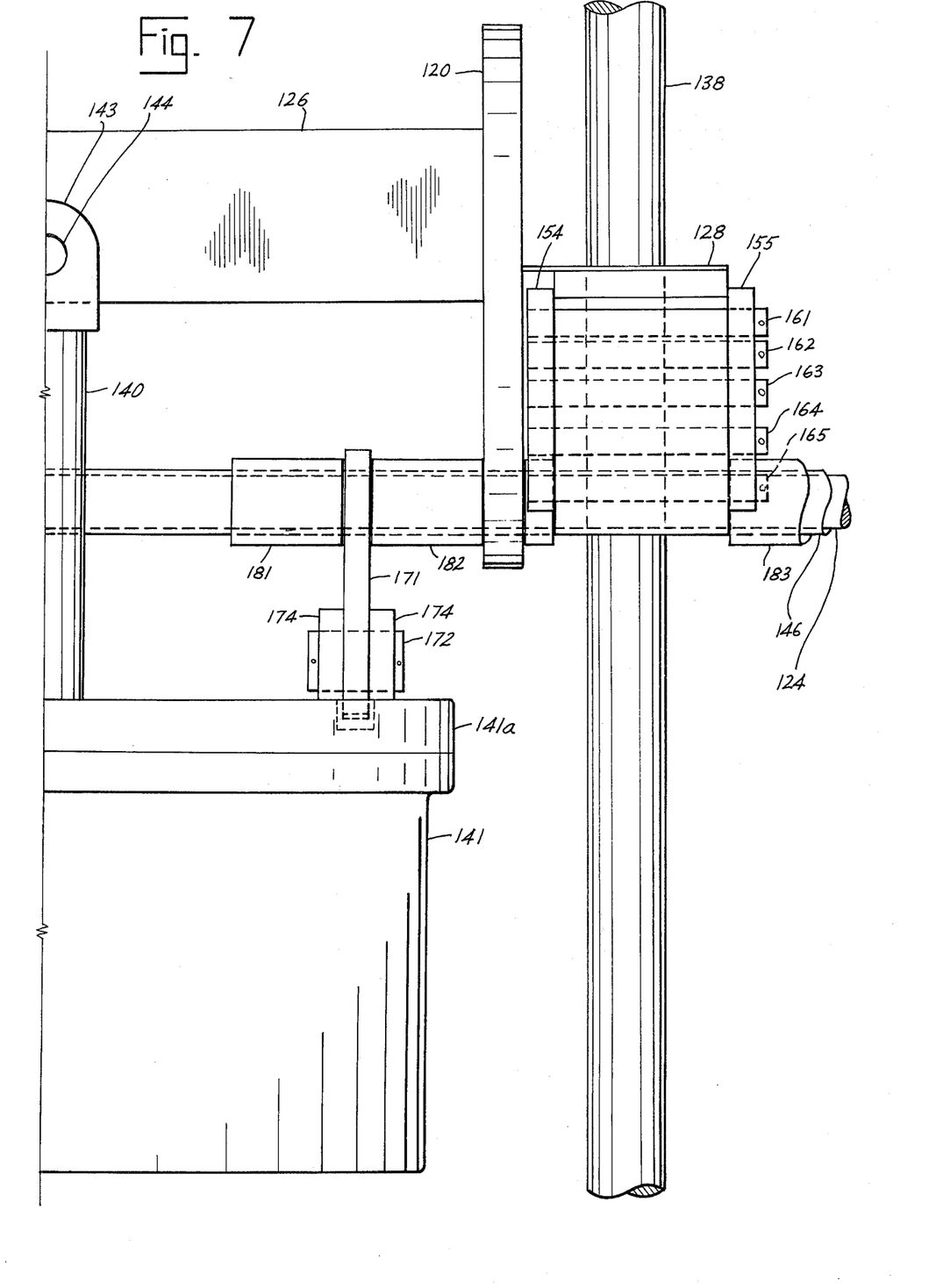
FIG. 7 is a partial side elevation of the apparatus shown in FIG. 6, showing the righthand half of such apparatus.
Figure 8:
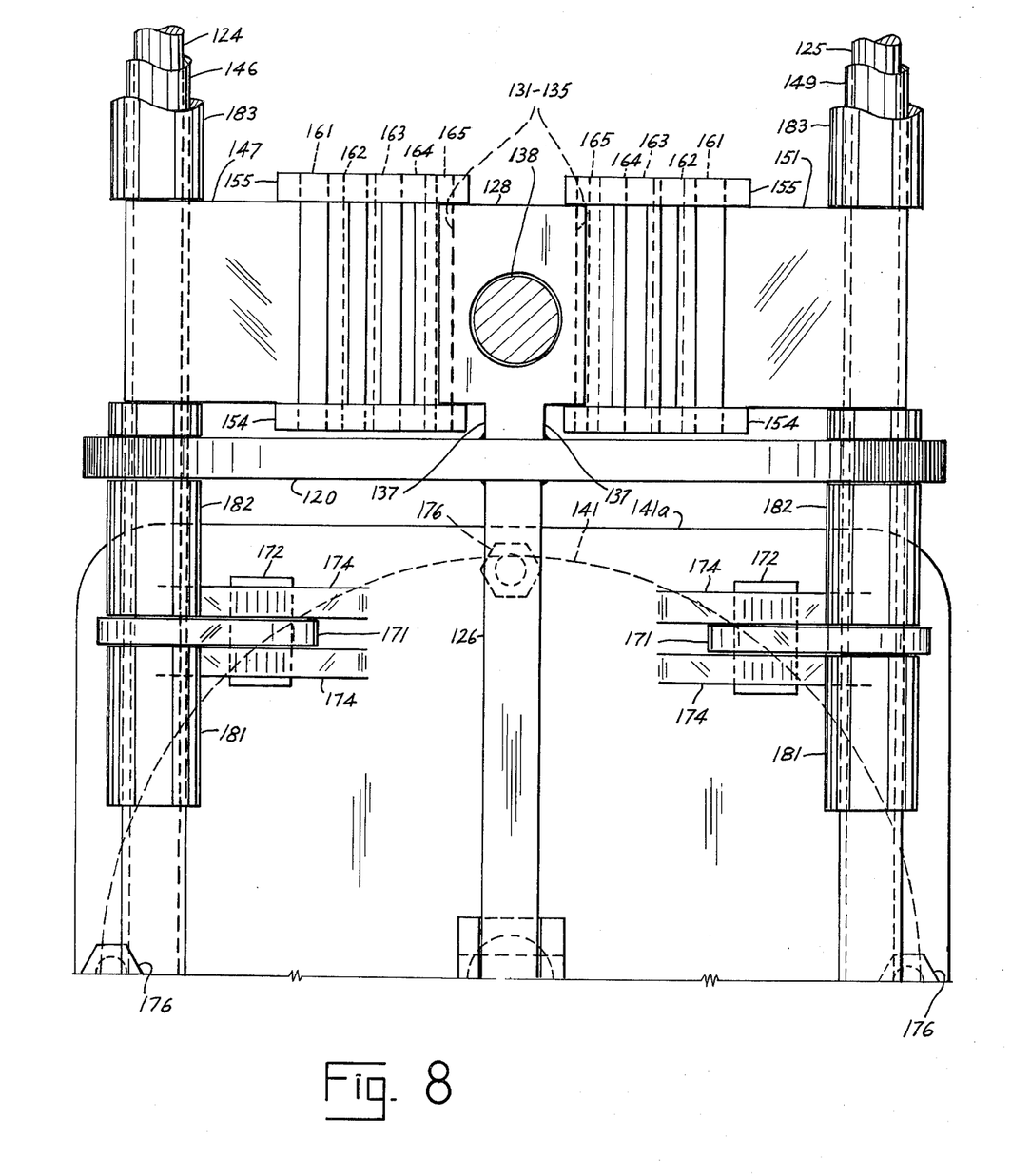
FIG. 8 is a partial top view showing the apparatus portion shown in FIG. 7.

In FIGS. 6-8 of the drawings, which show a further modified embodiment of toggle system apparatus according to the invention, only one-half of the complete apparatus is shown, and it will be realized that the mirror image other half of the apparatus will also be present. The apparatus has a pair of guide plates 120, only one being shown in the drawings. Each guide plate 120 has therethrough a pair of curved guide slots 121, 122 which guide the sleeved shafts 124, 125, respectively, during expansion and retraction of the toggles. In FIGS. 6-8, the toggle system elements are shown in the fully expanded condition of the toggle system.

The guide plates 120 are connected together by a cross bar 126. Because of the interconnecting cross bar 126, the guide plates 120 are raised and lowered simultaneously. Each guide plate 120 has integrally affixed thereto a block 128 having a plurality of semicylindrical recesses 131-135 at each of its sides. Block 128 is relieved at each side at 137 vertically adjacent the plate 120.

A pair of vertical shafts 138 are provided, each slidably disposed through a vertical cylindrical opening through one of the blocks 128. The shafts 138 are fixed to suitable stationary supports, not shown, which may or may not form parts of the subject apparatus. The guide plates 120 and blocks 128 each are slidably movable along one of the shafts 138. The shaft 140 of hydraulic or pneumatic cylinder 141 is connected by yoke 143 and connection pin 144 to the center of cross bar 126. Extension of shaft 140 raises the guide plates 120 and blocks 128, while retraction of shaft 140 lowers these elements.

Shaft 124 has sleeve 146 closely but rotatably disposed therearound to which is welded the outer end of a wedge-shaped toggle block 147. Shaft 125 has sleeve 149 closely but rotatably disposed therearound to which is welded the outer end of a wedge-shaped toggle block 151. It will be realized that another similar assembly is provided at the opposite end of the apparatus. Each of the four toggle blocks has affixed to its opposite sides a pair of retainer plates 154, 155. Each retainer plate has a plurality of cylindrical openings therethrough through which are disposed a plurality of toggle bars 161–165. The plurality of toggle bars 161–165 will preferably be the same plurality as the block 128 recesses 131–135. Each toggle bar 161 is closer to the axis of a shaft 124 or 125 than is each toggle bar 165, and the intermediate toggle bars therebetween are at stepwisely increased distances. From the descriptions of the earlier embodiments, it should be understood that the shafts 124, 125 are moved farther apart in stepwise fashion as the toggle system is moved from its retracted to its extended position. When the system is in its retracted condition, the toggle bars 161 are engaged in recesses 131 as shown by dashed lines in FIG. 6. Engagement of toggle bars 162 in recesses 132 moves shafts 124, 125 farther apart when toggle bars 163 are engaged in recesses 133, the shafts 124, 125 are still farther apart. This outward movement of shafts 124, 125 continues until toggle bars 165 are engaged in recesses 135, the shafts 124, 125 and toggle bars each successively being moved to positions of alignment between shafts 124, 125 as heretofore described to achieve maximum outward horizontal forces on the shafts 124, 125.

Sleeved shafts 124, 125 each have one end of a toggle element 171 pivotally connected therearound, the other end of each toggle element 171 being pivotally connected to a pin 172 extending through a hole through the toggle element and through opposite raised supports 174. The cover or top 141a of cylinder 141 has a squared configuration as is best shown in FIG. 8, which overhangs the cylinder at its corners. The supports 174 are integrally formed at the upper side of cover 141a. The cover is removably secured to the cylinder by a plurality of screws 176.

The toggle system is retracted, that is, the shafts 124, 125 are closest together, when the guide plates 120 and blocks 128 are lowered by retraction of shaft 140 of cylinder 141. When the guide plates and blocks 128 are lowered, the shafts 124, 125 remaining at a nearly constant elevation as they are pivoted by toggle elements 171, the sleeves 146, 149 around the shafts 124, 125, respectively, are at the upper ends of slots 121, 122, respectively. The toggle bars 161 are engaged in recesses 131 of block 128 as is indicated by the dashed line showing in FIG. 6. When shaft 140 of cylinder 141 is extended to extend or expand the toggle system, the sleeved shafts 124, 125 move downwardly in slots 121, 122, respectively, each moving horizontally outwardly simultaneously.

The provision of guide slots 121, 122 for sleeved shafts 124, 125 provides control of the toggles in any position, and enables full retraction of the toggles. When the toggles are retracted, the bars 161 are held engaged in slots 131 by the relative positions of sleeved shafts 124, 125 and the blocks 128. The same applies to each toggle bar engagement with the respective slot 131–135 so that the toggle system is fully controlled at each position of its movement.

Referring especially to FIGS. 7 and 8, but still also to FIG. 6, each sleeved shaft 124, 125 has therearound a plurality of sleeves 181, 182 and 183. These are provided for engagement by opposed pressure bars 185, 186, each of which is inwardly recessed semi-cylindrically to engage the sleeves 181–183 as shown in FIG. 6. The engagement bars 185, 186 are moved farther apart by expansion of the toggle system, and may move closer together by retraction thereof. Engagement bars 185, 186 may, for example, be elements of an apparatus operated or controlled by expansion and retraction of the toggle system herein described.

It will be realized that toggle systems are afforded according to this invention which maintain toggle force through a larger than customary arc of toggle movement. The force becomes maximum when the first toggle engagement arrives at its peak position in line with the direction of force application, and then as the second and subsequent engagement bars come to this in line position, the maximum force is repeatedly applied. It should also be pointed out that there is no lapse of force application as the toggle elements are moved from one engagement point to the next, since the next engagement is made and begins to exert force when the prior engagement force reaches maximum. All of the forces are applied using small angles of toggle movement at small angles to the direction of force application which results in maximum force application.

While preferred embodiments of the invention have been described and shown in the drawings, many modifications thereof may be made by a person skilled in the art without departing from the spirit of the invention, and it is intended to protect by Letters Patent, all forms of the invention falling within the scope of the following claims.

I claim:

1. Toggle system, comprising plural opposed toggle elements having plural spaced engagement means at their inner ends and adapted for pivotal engagement with one or more objects at their outer ends, operating means disposed between said opposed toggle elements also having plural spaced engagement means for engagement one after another with said engagement means of said toggle elements, individual engagement means of said toggle elements and said operating means being mutually engaged sequentially one after another when said toggle elements are pivotally moved about said pivotal engagements with one or more objects by movement of said operating means to bring the engagement means of opposed toggle elements sequentially one after another into positions of maximum span in line between said pivotal engagements with one or more objects, the next subsequent toggle engagement means engaging in the next subsequent operating means engagement means at the time that one toggle engagement means already engaged in an operating means engagement means reaches a position aligned between said pivotal engagements of opposed toggle elements, the maximum span between said pivotal engagements with one or more objects increasing stepwise from a shorter span when the engagement means at one end of said pluralities thereof are engaged to a longer span when the engagement means at the other end of said pluralities thereof are engaged, whereby as the space between objects pivotally engaged by said toggle elements increases as said span increases in length the force on said objects is maintained at or near maximum as sequential of said engagements occur.

2. The combination of claim 1, said operating means comprising longitudinally movable means disposed between the inner ends of opposed ones of said toggle elements, said longitudinally movable means having said spaced engagement means along opposite sides thereof for engaging said engagement means of said opposed toggle elements, whereby longitudinal movement of said longitudinally movable means rotates said toggle elements.

3. The combination of claim 2, said engagement means of said toggle elements each comprising a cylindrical element affixed to said inner end of the toggle element, and said spaced engagement means of said operating means each comprising a cylindrical recess adapted to receive a said cylindrical element.

4. The combination of claim 3, said longitudinally movable means comprising an elongate bar having said spaced engagement means oppositely disposed along opposite sides thereof.

5. The combination of claim 1, said objects and toggle elements being circularly spaced and said toggle elements having their said inner ends directed inwardly from said objects, said operating means comprising rotatable means concentrically disposed between said toggle elements having means therearound for successively engaging said innermost and subsequent ones of said engagement means of all of said toggle elements upon rotation of said rotatable means.

6. The combination of claim 5, said engagement means on said inner ends of said toggle elements and said engaging means around said rotatable means comprising spaced parallel bars on one of said toggle elements and rotatable means and spaced parallel recesses on the other of said toggle elements and rotatable means.

7. The combination of claim 6, said engagement means on each said toggle element being equally spaced across the end of the element, and said engaging means around said rotatable means being identically equally spaced completely around said rotatable means.

8. The combination of claim 7, said bars and recesses each being of corresponding cylindrical form.

9. The combination of claim 1, said plural opposed toggle elements comprising two toggle elements disposed in opposed directions from said operating means, said operating means comprising bar means having mutually angular sides having said plural engagement means therealong, said plural engagement means of said toggle elements being disposed circularly around said pivotal engagements with said objects.

10. The combination of claim 1, said plural opposed toggle elements comprising two toggle elements disposed in opposed directions from said operating means, said operating means having parallel sides having said engagement means spaced oppositely therealong, said engagement means of said toggle elements being spaced spirally about said pivotal engagements with to said objects.

11. The combination of claim 1, including means for guiding the movements of said pivotal engagements of the outer ends of said toggle elements during pivotal movements of said toggle elements to maintain said engagement means of said toggle elements and said operating means in engagement.

12. The combination of claim 11, said plural opposed toggle elements comprising two toggle elements disposed in opposed directions from said operating means, said operating means having parallel sides having said engagement means spaced oppositely therealong, said engagement means of said toggle elements being spaced spirally about said pivotal connections to said objects.

13. The combination of claim 1, said pivotal engagement of the outer end of each said toggle element comprising an elongate cylindrical element having sleeve means disposed therearound, each said toggle element having its outer end integrally connected to said sleeve means and being thereby pivotally movable with respect to said elongate cylindrical element.

14. The combination of claim 13, said pivotal engagement of the outer end of each said toggle element also comprising slotted engagement means for receiving said elongate cylindrical element therein, said force on said objects being transmitted through said slotted engagement means.

15. The combination of claim 14, each said elongate cylindrical element comprising a elongate metal rod having a plurality of said toggle elements integrally connected to said sleeve means disposed therearound.

16. The combination of claim 13, said operating means comprising longitudinally movable means disposed between the inner ends of opposed ones of said toggle elements, said longitudinally movable means having said spaced engagement means along opposite sides thereof for engaging said engagement means of said opposed toggle elements, whereby longitudinal movement of said longitudinally movable means rotates said toggle elements.

17. The combination of claim 16, said engagement means at said inner ends of said toggle elements each comprising a cylindrical element affixed to said inner end of the toggle element, and said spaced engagement means of said operating means each comprising a cylindrical recess adapted to receive a said cylindrical element.

18. The combination of claim 13, said plural opposed toggle elements comprising two toggle elements disposed in opposed directions from said operating means, said operating means having parallel sides having said engagement means spaced oppositely therealong, said engagement means of said toggle elements being spaced spirally about said pivotal connections to said objects.

19. The combination of claim 1, said pivotal engagement of the outer end of each said toggle element comprising a rotatable elongate cylindrical element, each said toggle element having its outer end integrally connected to said cylindrical element and being thereby pivotally movable, plate means disposed transverse to said cylindrical elements and fixed to said operating means to be movable therewith, a pair of slot means through said plate means each receiving one of said cylindrical elements therethrough and guiding movements of said cylindrical elements, cylinder means for moving said operating means and plate means to move said cylindrical elements closer together and farther apart through pivotal movements of said toggle elements, and pivotal toggle means engaged between said cylindrical elements and fixed support means to restrain said movements of said cylindrical elements to said movements closer together and farther apart.

20. The combination of claim 19, said plate means being connected together in pairs, each said cylinder means moving a pair of said plate means and the associated operating means.

21. The combination of claim 19, said operating means comprising longitudinally movable means disposed between the inner ends of opposed ones of said toggle elements, said longitudinally movable means having said spaced engagement means along opposite sides thereof for engaging said engagement means of said opposed toggle elements, whereby longitudinal movement of said longitudinally movable means rotates said toggle elements.

22. The combination of claim 21, said engagement means at the inner ends of said toggle elements each comprising a cylindrical element affixed to said inner end of the toggle element, and said spaced engagement means of said operating means each comprising a cylindrical recess adapted to receive a said cylindrical element.

23. The combination of claim 19, said plural opposed toggle elements comprising two toggle elements disposed in opposed directions from said operating means, said operating means having parallel sides having said engagement means spaced oppositely therealong, said engagement means of said toggle elements being spaced spirally about said pivotal connections to said objects.

24. Toggle system, comprising a plurality of opposed toggle elements each having inner and outer ends, said outer ends of said toggle elements being adapted for pivotal connection to spaced opposed objects, said inner end of each said toggle element having a plurality of equally spaced engagement means disposed therealong along a curve the locus of which is progressively uniformly spaced farther from said pivotal connection and which curve curves inwardly from the tangent to a circle about said pivotal connection through the innermost of said engagement means, means for rotating said toggle elements to move said inner ends of opposed toggle elements to progressively bring said innermost and subsequent of said engagement means of said toggle elements to between their pivotal connections to progressively urge the opposed objects apart under maximum compressive force of said toggle elements between said pivotal connections and said innermost and subsequent engagement means of each toggle element, the next subsequent toggle engagement means becoming engaged at the time that one toggle engagement means already engaged reaches a position aligned between said pivotal connections of opposed toggle elements.

25. The combination of claim 24, said means for rotating said toggle elements comprising a link element pivotally connected at one end to each said toggle element at a point spaced from said pivotal connection thereof, and longitudinally movable means connected to the other end of each said link element.

26. The combination of claim 25, said engagement means of one toggle element of each pair of opposed toggle elements comprising a plurality of equally spaced parallel cylindrical bars affixed to the inner end of the toggle element, and said engagement means of the other toggle element of each pair of opposed toggle elements comprising a plurality of equally spaced parallel cylindrical recesses adapted to receive said cylindrical bars.

27. The combination of claim 24, said means for rotating said toggle elements comprising longitudinally movable means disposed between the inner ends of opposed ones of said toggle elements, said longitudinally movable means having spaced means along opposite sides thereof for engaging said engagement means of said opposed toggle elements, whereby longitudinal movement of said longitudinally movable means rotates said toggle elements.

28. The combination of claim 27, said engagement means at said inner ends of said toggle elements each comprising a cylindrical element affixed to said inner end of the toggle element, and said spaced engagement means of said means for rotating said toggle elements each comprising a cylindrical recess adapted to receive a said cylindrical element.

* * * * *